(12) United States Patent
Han et al.

(10) Patent No.: US 12,502,144 B2
(45) Date of Patent: Dec. 23, 2025

(54) METHOD, SYSTEM, AND MEDICAL IMAGING DEVICE FOR ACQUIRING PHYSIOLOGICAL SIGNAL OF TARGET

(71) Applicant: SHANGHAI UNITED IMAGING HEALTHCARE CO., LTD., Shanghai (CN)

(72) Inventors: Zhenzhong Han, Shanghai (CN); Zhenbao Liu, Shanghai (CN); Jianqiao Chen, Shanghai (CN); Shiming Hu, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 28 days.

(21) Appl. No.: 18/585,139

(22) Filed: Feb. 23, 2024

(65) Prior Publication Data
US 2024/0225563 A1   Jul. 11, 2024

Related U.S. Application Data

(63) Continuation of application No. PCT/CN2022/114523, filed on Aug. 24, 2022.

(30) Foreign Application Priority Data

Aug. 30, 2021   (CN) .......................... 202111005234.1

(51) Int. Cl.
*A61B 5/05* (2021.01)
*A61B 5/00* (2006.01)

(52) U.S. Cl.
CPC .......... *A61B 5/7292* (2013.01); *A61B 5/0064* (2013.01); *A61B 5/05* (2013.01); *A61B 5/704* (2013.01)

(58) Field of Classification Search
CPC ..... A61B 5/7292; A61B 5/704; A61B 5/0064; A61B 5/05
See application file for complete search history.

(56) References Cited

U.S. PATENT DOCUMENTS

| 2008/0107229 A1 | 5/2008 | Thomas et al. |
| 2010/0220909 A1 | 9/2010 | Thielemans et al. |
| (Continued) | | |

FOREIGN PATENT DOCUMENTS

| CN | 106264502 B | 9/2019 |
| CN | 110680371 A | 1/2020 |
| (Continued) | | |

OTHER PUBLICATIONS

International Search Report in PCT/CN2022/114523 mailed on Nov. 23, 2022, 5 pages.

(Continued)

*Primary Examiner* — Joel F Brutus
(74) *Attorney, Agent, or Firm* — METIS IP LLC

(57) ABSTRACT

The embodiments of the present disclosure provide a system, a method, and a medical imaging device for acquiring a physiological signal of a target. The system may include a projection module configured to project a structured light to a designated region of the target; an acquisition module configured to acquire a reflected structured light formed by the structured light reaching the designated region; and a processing module configured to determine the physiological signal of the target based on the acquired reflected structured light.

20 Claims, 6 Drawing Sheets

(56) References Cited

U.S. PATENT DOCUMENTS

| | | | |
|---|---|---|---|
| 2011/0313231 A1 | 12/2011 | Guertin et al. | |
| 2018/0117359 A1 | 5/2018 | Hale | |
| 2018/0317861 A1 | 11/2018 | Sun et al. | |
| 2019/0083008 A1* | 3/2019 | Ghahremani | G01S 13/88 |
| 2020/0302619 A1 | 9/2020 | Lu et al. | |
| 2020/0352524 A1 | 11/2020 | Hu et al. | |
| 2021/0049765 A1 | 2/2021 | Cao et al. | |
| 2021/0196434 A1* | 7/2021 | Cramer | G06T 7/0012 |
| 2023/0181144 A1 | 6/2023 | Sun et al. | |

FOREIGN PATENT DOCUMENTS

| | | |
|---|---|---|
| CN | 210055993 U | 2/2020 |
| CN | 111474508 A | 7/2020 |
| CN | 212037549 U | 12/2020 |
| EP | 3756536 A1 | 12/2020 |
| WO | 2020148192 A1 | 7/2020 |
| WO | 2023030132 A1 | 3/2023 |

OTHER PUBLICATIONS

Written Opinion in PCT/CN2022/114523 mailed on Nov. 23, 2022, 5 pages.
First Office Action in Chinese Application No. 202111005234.1 mailed on Mar. 31, 2023, 13 pages.
The Extended European Search Report in European Application No. 22863271.7 mailed on Oct. 8, 2024, 8 pages.

* cited by examiner

METHOD, SYSTEM, AND MEDICAL IMAGING DEVICE FOR ACQUIRING PHYSIOLOGICAL SIGNAL OF TARGET

CROSS-REFERENCE TO RELATED APPLICATIONS

This application is a Continuation of International Application No. PCT/CN2022/114523, filed on Aug. 24, 2022, which claims priority of Chinese Patent Application No. 202111005234.1, filed on Aug. 30, 2021, the contents of which are hereby incorporated by reference.

TECHNICAL FIELD

The present disclosure relates to the technical field of a medical imaging device, in particular, relates to a system, a method, and a medical imaging device for acquiring a physiological signal of a target.

BACKGROUND

Currently, in a medical imaging device, a breathing and heartbeat motion detection of a target is an important system function. When the target is scanned using Computed Tomography (CT) or Positron Emission Computed Tomography (PET), image artifacts caused by the motion need to be considered, such as breathing, heartbeat, head rigid motion, etc. At present, motion information is usually obtained by an external motion monitoring device, and reconstruction algorithms such as gated bin and motion calibration may eliminate the image artifacts caused by the motion, which can improve the image quality. However, the system implementation of the external motion monitoring device is complex, and an additional external device is required. In addition, the gated bin is an independent manner or applicable to a fixed scenario, which is difficult to be combined with other reconstruction algorithm.

Therefore, it is desirable to provide a system, a method, and a medical imaging device for acquiring a physiological signal of a target.

SUMMARY

One aspect of the present disclosure may provide a system for acquiring a physiological signal of a target. The system may include: a projection module configured to project a structured light to a designated region of the target; an acquisition module configured to acquire a reflected structured light formed by the structured light reaching the designated region; and a processing module configured to determine the physiological signal of the target based on the acquired reflected structured light.

Another aspect of the present disclosure may provide a medical imaging device, comprising a system for acquiring a physiological signal of a target, the physiological signal acquisition system including an acquisition module, a projection module, and a processing module. The acquisition module may communicate with the projection module and the processing module. The projection module may be configured to project a structured light to a designated region of a target. The acquisition module may be configured to acquire a reflected structured light formed by the structured light reaching the designated region projected by the projection module. The processing module may be configured to determine the physiological signal of the target based on the reflected structured light acquired by the acquisition module.

Another aspect of the present disclosure may provide a method for controlling a medical imaging device. The method may include: controlling a projection module and an acquisition module to move to a designated position; determining a structured light of the projection module; controlling the projection module to perform projection based on medical information of a target; acquiring a reflected structured light of the structured light by controlling the acquisition module; determining a physiological signal of the target based on the reflected structured light; and controlling the medical imaging device to perform one or more relevant operations based on the physiological signal of the target.

DETAILED DESCRIPTION

Figure 1:
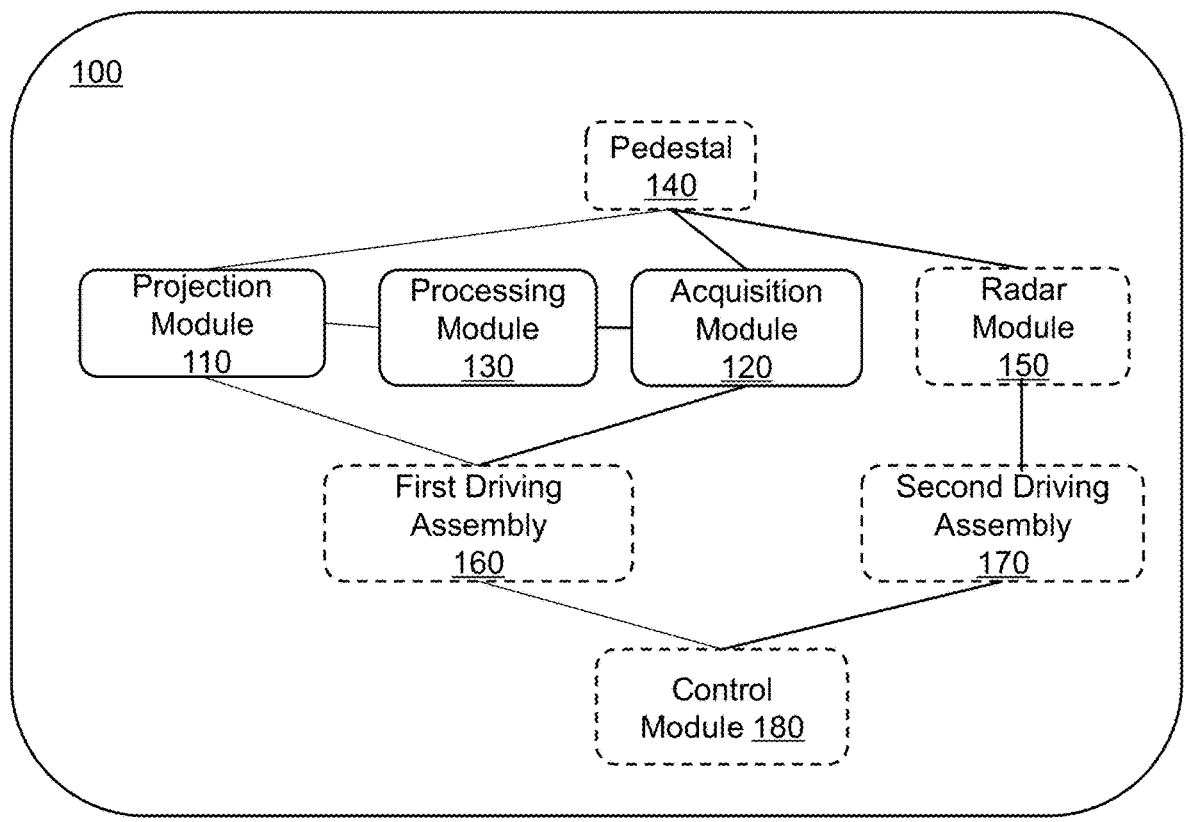
FIG. 1 is a schematic diagram illustrating an exemplary system for acquiring a physiological signal according to some embodiments of the present disclosure.

To more clearly illustrate the technical solutions related to the embodiments of the present disclosure, a brief introduction of the drawings referred to the description of the embodiments is provided below. Obviously, the accompanying drawing in the following description is merely some examples or embodiments of the present disclosure, for those skilled in the art, the present disclosure may further be applied in other similar situations according to the drawings without any creative effort. Unless obviously obtained from the context or the context illustrates otherwise, the same numeral in the drawings refers to the same structure or operation.

The present disclosure provides a system for acquiring a physiological signal of a target. In some embodiments, the system for acquiring the physiological signal of the target may include a projection module, an acquisition module, and a processing module. The projection module may be configured to project a structured light to a designated region of the target. The acquisition module may be configured to acquire reflected structured light formed by the structured light reaching the designated region. The processing module may be configured to determine the physiological signal of the target based on the reflected structured light. When the human body performs physiological movements (e.g., breathing, heartbeat), the contour of the body (e.g., chest, head) of a user may fluctuate. In some embodiments, the processing module may determine information of the target such as a position and a depth of the body surface according to a change of the reflected structured light (e.g., an optical signal) caused by the target, and further obtain a change of a contour corresponding to the designated region of the target and the physiological signal of the target by restoring an entire three-dimensional (3D) space, such as a heartbeat signal or a breathing signal, etc. When performing the medical scanning, the position of the target may be relatively fixed and stationary, the breathing and heartbeat of target may cause slight movement or fluctuation of a designated portion (also be known as target to be scanned), and the scanning image may produce artifacts, which may affect the imaging efficiency and the image clarity of the medical imaging device. In some embodiments, the system for acquiring the physiological signal of the target provided in the present disclosure may be applied to the medical imaging device to improve the imaging efficiency of the medical imaging device and the image accuracy. For example, the physiological signal acquisition system may be used for the gated triggering of the medical imaging device, which may complete the scanning of the medical imaging device within a specific time range and reduce the occurrence of the artifacts in the scanning image caused by the breathing and heartbeat of the target. As another example, the medical image (also referred to as the scanning image) obtained by the medical imaging device may perform a calibration processing based on the physiological signal of the target to eliminate the artifacts in the scanning image. As a further example, when scanning the target, the breathing of the target may be monitored by the physiological signal (such as a breathing signal) acquired by the physiological signal acquisition system, if the breathing signal of the target is abnormal, an operator may guide the target to ensure the stable breathing and prevent the contour of the chest or upper abdomen of the target from violent fluctuations, which may reduce the artifacts in the scanning image and improve the imaging efficiency and clarity of the medical imaging device. In some embodiments, the medical imaging device may include but is not limited to any one or any combination of a Positron Emission Computed Tomography (PET) scanning device, a Computed Tomography (CT) scanning device, a Magnetic Resonance (MR) scanning device, a Single Photon Emission Computed Tomography (SPECT) scanning device. Further, the physiological signal acquisition system may be applied to gate triggering of the medical imaging device, without relying on depth data to obtain vital sign information, the physiological signal of the target may be detected in any posture, even if the skin is not exposed, the physiological signal of the target may be detected accurately, and improve the imaging efficiency and image accuracy of the medical imaging device. In addition, in the physiological signal acquisition system, the projection module and the acquisition module may be integrated and set together, which may be conducive to simplifying the structure, reducing the overall size of the device, reducing the hardware cost, and improving the reliability.

FIG. 1 is a schematic diagram illustrating an exemplary system for acquiring a physiological signal according to some embodiments of the present disclosure. In some embodiments, the physiological signal acquisition system 100 may include a projection module 110, an acquisition module 120, a processing module 130, the acquisition module 120, and the acquisition module 120 may communicate with the processing module 130. In some embodiments, the projection module 110 and the acquisition module 120 may communicate with the processing module 130 through a wired network or a wireless network.

The projection module 110 may be configured to project a structured light to a designated region of the target. In some embodiments, the projection module 110 may emit the structured light to the designated region of the target. In some embodiments, the projection module 110 may emit the structured light to project the designated region of the body of the target. In some embodiments, the projection module 110 may include a light emitter or a projector. In some embodiments, the structured light may include a natural light or an artificial ambient light (e.g., a light from a light device). In some embodiments, the natural light or artificial ambient light may be visible or invisible light (e.g., infrared light).

The acquisition module 120 may be configured to acquire a reflected structured light from the designated region. In some embodiments, the acquisition module 120 may be a camera, the reflected structured light may generate formed by the structured light projected by the projection module 110 reaching the designated region of the target, and the acquisition module 120 may capture the reflected structured light from a designated region of a plurality of video frame.

The processing module 130 may be configured to determine the physiological signal of the target based on the acquire reflected structured light. In some embodiments, the processing module 130 may include a processor. In some embodiments, the physiological signal may include one or more of a heartbeat signal, a breathing signal, and motion information. Taking the structured light as an example, the projection module 110 may impart the structured light to a part of the surface of the body of the target. In some embodiments, the structured light may be used as an example below. The structured light may include the shape, size, and position distribution of a plurality of light elements. In some embodiments, the shape of the light element may include regular or irregular shapes such as circles, ellipses, polygons (e.g., triangles, quadrilaterals, etc.), and semicircles. In some embodiments, the shape of the light element projected by the projection module 110 to the designated region of the target may be similar or different. For example, the shape of the light element projected by the projection module 110 to the designated region of the target may be circular. As another example, the shape of the light element projected by the projection module 110 to the designated region of the target may be circle, triangle, quadrilateral, etc. Further, the different projected regions of the structured light may be referred to as "elements". The motion of human body in related to the breathing and/or heartbeat may cause changes in one or more of light distribution, shape distribution, size distribution, positional distribution of elements of the structured light, and/or changes of the count of elements, these changes may be obtained by the acquisition module 120. In some embodiments, the acquisition module 120 may be a camera, the acquisition module 120 may obtain a plurality of images of the video frames by capturing changes of elements of the structured light caused by body motion of the target in different time, obtain a value signal representing the heartbeat and/or breathing of the target by calculating and processing the images of the video frames may be calculated and processed by the processing module 130, in other words, the plurality of images of the video frame acquired by the acquisition module 120 may obtain the breathing signal and/or heartbeat signal of the target processed by the processing module 130.

It should be noted that the structured light above may be an example in the present disclosure, in some alternatively embodiments, other types of lights may be used. For example, the types of lights may be a light pulse, a natural light. In some embodiments, types of cameras may include but are not limited to a time of flight (TOF) camera, a binocular camera, etc. For example, when using the light pulse, the projection module 110 may emit the light pulse to the target, and the TOF camera may receive a light returned from the target. By detecting a flight (round-trip) time of light pulses at different time, fluctuation information of the body surface of the target may be obtained. After calculating by the processing module 130, the value signal representing the heartbeat and/or breathing of the target may be obtained. As another example, when using the natural light or the projection module 110 does not emit light, the binocular camera may obtain two frames of images of the target captured by two cameras at the same time, according to the geometric relationship of parallax, a depth from the binocular camera to the designated region of the target may be determined. The fluctuation information of the body surface of the target may be obtained by different images of the video frame, after calculating by the processing module 130, the value signal representing the heartbeat and/or breathing of the target may be obtained.

In some embodiments, the physiological signal acquisition system 100 may further include a pedestal 140, wherein the acquisition module 120 and the projection module 110 are arranged on the pedestal respectively. In some embodiments, the acquisition module 120 and the projection module 110 are movably or rotatably arranged on the pedestal. For illustrative purposes only, for example, the acquisition module 120 and the projection module 110 are movably or rotatably arranged on the pedestal by at least one of a rotation shaft, a gear part, and other structures. As another example, the acquisition module 120 and the projection module 110 are movably or rotatably arranged on the pedestal by at least one a screw rod, a guide rail, and other structures. In some embodiments, when the projection module 110 and the acquisition module 120 communicate with the pedestal by the rotation shaft, a rotation shaft corresponding to the projection module 110 may coincide with a rotation shaft corresponding to the acquisition module 120, and the projection module 110 and the acquisition module 120 may be arranged rotatably. In some embodiments, the rotation shaft corresponding to the projection module 110 and the rotation shaft corresponding to the projection module 110 may be different, or one of the projection module 110 and the acquisition module 120 may rotate relative to the pedestal 140, and another may be fixed on the pedestal 140, those skilled in the art may configure according to an actual situation. In some embodiments, the acquisition module 120 moves with a movement of the projection module 110 to ensure that the acquisition module 120 may effectively obtain the structured light projected by the projection module 110. For example, the acquisition module 110 may be rotated with a rotation of the projection module 110. As another example, the acquisition module 120 may move with the movement of the projection module 110. It should be noted that a working range between the projection module 110 and the acquisition module 120 may overlap each other, in fact, since the projection module 110 and the acquisition module 120 have a certain distance from the target, the working range of the projection module 110 and the acquisition module 120 should roughly coincide when extending to the body surface of the target, or the working range (i.e., a capture range) of the acquisition module 120 may slightly larger than the working range (i.e., a projected range) of the projection module 110, so that the acquisition module 120 may acquire the structured light projected by the projection module 110 effectively.

In some embodiments, the physiological signal acquisition system 100 may include a first driving assembly 160, the acquisition module 120, and the projection module 110 are connected to the first driving assembly 160 and may drive the acquisition module 120 and the projection module 110 to rotate. More descriptions about a specific structure of the first driving assembly 160 may refer to FIG. 5 and related descriptions, which may not be repeated here.

In some embodiments, the physiological signal acquisition system 100 may further include a radar module 150, and the radar module 150 may be configured to obtain a reflected wave from the target. Specifically, the radar module 150 may be configured to emit an electromagnetic wave to the target and obtain a reflected wave from the target. In some embodiments, the radar module 150 may be a millimeter wave radar, the millimeter wave radar may be a radar working in millimeter wave detection. A frequency domain of millimeter wave may be about 30 GHZ~300 GHZ, a wavelength of millimeter wave may be between a microwave and a centimeter wave. Therefore, the millimeter wave radar has the characteristics of both microwave radar and photoelectric radar. Applying the millimeter wave radar to the medical imaging device has unique advantages. In some embodiments, the radar module 150 may communicate with the processing module 130, the processing module 130 may obtain the physiological signal of the target (e.g., the breathing signal) based on the electromagnetic wave emitted by the radar module 150 and the reflected wave obtained by the radar module 150. During the medical scanning, the position of the target may be relatively fixed and stationary, the breathing or heartbeat of the target may cause slight movement or fluctuation of the designated portion (also known as the target to be scanned), the fluctuation of the target may be obtained by the electromagnetic wave emitted by the radar module 150 and the reflected wave obtained by the radar module 150 during the physiological movement (e.g., breathing).

In some embodiments, the radar module 150 may be configured to detect the motion of breathing, at this time, the detection position of the radar module 150 may be position corresponding to an abdomen of the target. When the position of the target is fixed, for example, the position corresponding to the abdomen of the target is fixed relative to position of a scanning bed, after arranging an initial orientation of the radar module 150, the radar module 150 may move with a movement of the scanning bed.

In some embodiments, the radar module 150 may be further used to detect other movements, for example, the radar module 150 may be used to detect a movement of head of the target. When scanning the designated region of the target by using the medical imaging device, the head of the target may move, which may produce the artifacts in the scanning image of the head. Based on this problem, in some embodiments, the reflected wave within a certain range of the designated region may be obtained by arranging the radar module 150, but may not acquire signal specifically for different regions, and further combine the images captured by the acquisition module 120. The processing module may be configured to obtain position information of the target, and further determine a designated region scanned by the radar module 150, to emit a head trigger, a heartbeat trigger, or a breathing trigger to the medical imaging device and trigger the medical imaging device to scan, so that the medical imaging device may complete the scanning of the designate region of the target within a specific time frame and the occurrence of the artifacts may be reduced in scanning image caused by the breathing or heartbeat of the target. The medical imaging device has scanning protocol information (also referred to as protocol information) when scanning the target, in some embodiments, the protocol information may include information of a designated portion of the target and/or a designated posture of the target, the information of at least one of the designated portion of the target or the designated posture of the target has a preset relationship with a detection position of the radar module 150, so that the radar module 150 may determine orientation according to the information of the designated portion of the target and/or the posture information of the target and an end the radar module 150 that emits the electromagnetic wave is directed toward the designated region of the target.

In some embodiments, the physiological signal acquisition system 100 may further include a second driving assembly 170, the second driving assembly 170 may be connected with the radar module 150, and configured to drive the radar module 150 to rotate. More descriptions about a specific structure of the second driving assembly 170 may refer to FIG. 6, FIG. 7, and the related descriptions.

In some embodiments, the physiological signal acquisition system 100 may further include a control module 180. The control module 180 may communicate with the first driving assembly 160 and the second driving assembly 170, respectively. The control module 180 may drive the first driving assembly 160 and the second driving assembly 170 to rotate corresponding modules, respectively, to make an emitting surface or detection surface of the projection module 110, the acquisition module 120, and the radar module 150 match a movement of the designate portion of the target or the scanning bed. The control module 180 may include a controller.

In some embodiments, the projection module 110, the acquisition module 120, and the radar module 150 may be arranged on a common rotation shaft. For example, the projection module 110, the acquisition module 120, and the radar module 150 may be jointly arranged on a first driving shaft of the first driving assembly 160 or a second driving shaft of the second driving assembly 160. As another example, a center line of the first driving shaft of the first driving assembly 160 may be in the same line with a center line of the second driving shaft of the second driving assembly 170. Further, rotation shafts of the projection module 110, the acquisition module 120, and the radar module 150 may be arranged on a radial direction of a scanning chamber of the medical imaging device, when the scanning bed is moving, by controlling the rotation of the first driving shaft of the first driving assembly 160 or the second driving shaft of the second driving assembly 160, the projection module 110, the acquisition module 120, and the radar module 150 may be controlled to rotate, for example, the projection module 110, the acquisition module 120, and the radar module 150 may be arranged on the same drive shaft and rotate simultaneously by controlling the drive shaft, so that the physiological signal acquisition system 100 may complete the acquiring of the physiological signal of the plurality of targets in a scanning process. For example, the projection module 110 and the acquisition module 120 may obtain the breathing signal and/or motion information of the target, and the radar module 150 may obtain the breathing signal and/or motion information of the target. In addition, when the target moves with the scanning bed, the projection module 110, the acquisition module 120, and the radar module 150 may obtain desired motion information, such as abdominal breathing, chest heartbeat, head movement, and other information of the target accurately, by adjusting angles synchronously, and by controlling the working states of different modules, and improve the imaging efficiency and image accuracy of the medical imaging device. The way of integrating the projection module 110, the acquisition module 120, and the radar module 150 in the physiological signal acquisition system 100 may be also conducive to simplifying the structure and reducing the overall size of the device. It should be noted that the projection module 110, the acquisition module 120, and the radar module 150 may be arranged on different shafts. For example, the projection module 110 and the acquisition module 120 may be arranged on the first driving shaft of the first driving assembly 160, the radar module 150 may be arranged on the second driving shaft of the second driving assembly 160, and the centerlines of the first driving shaft and the second driving shaft may be not on the same straight line.

In some embodiments, the control module 180 may communicate with the driving system of the scanning bed, the control module may be used to obtain the information of the designated portion of the target based on the driving system of the scanning bed, so that the working of the projection module 110, the acquisition module 120, and the radar module 150 (include but are not limited to respective rotations of the projection module 110, the acquisition module 120, and the radar module 150) may communicate with a medical scanning workflow and match to the movement of the scanning bed. Specifically, different patients may scan different designate portions each time, the drive system of the scanning bed may include a selected scanning protocol information before the scanning, and the scanning protocol information may include the information of the designated portion of the target and/or the posture information of the target, the acquisition system 100 may acquire the information of the designated portion of the target in the scanning protocol, to match the working of the projection module 110, the acquisition module 120, and the radar module 150 with the movement of the scanning bed accurately.

Further, the projection module 110, the acquisition module 120, and the radar module 150 may communicate with the control module, and the rotation angles or movement positions of the projection module 110, the acquisition module 120, and the radar module 150 may be adjusted according to the designated portion of the target and/or the designated posture of the target in the protocol information. The acquisition module 120, and the radar module 150 may obtain the information of the designated portion of the target and/or the posture of the target in the protocol information and adjust the designated portion of the target and/or the designated posture of the target to match with the protocol information by communicating with the control module.

Figure 2:
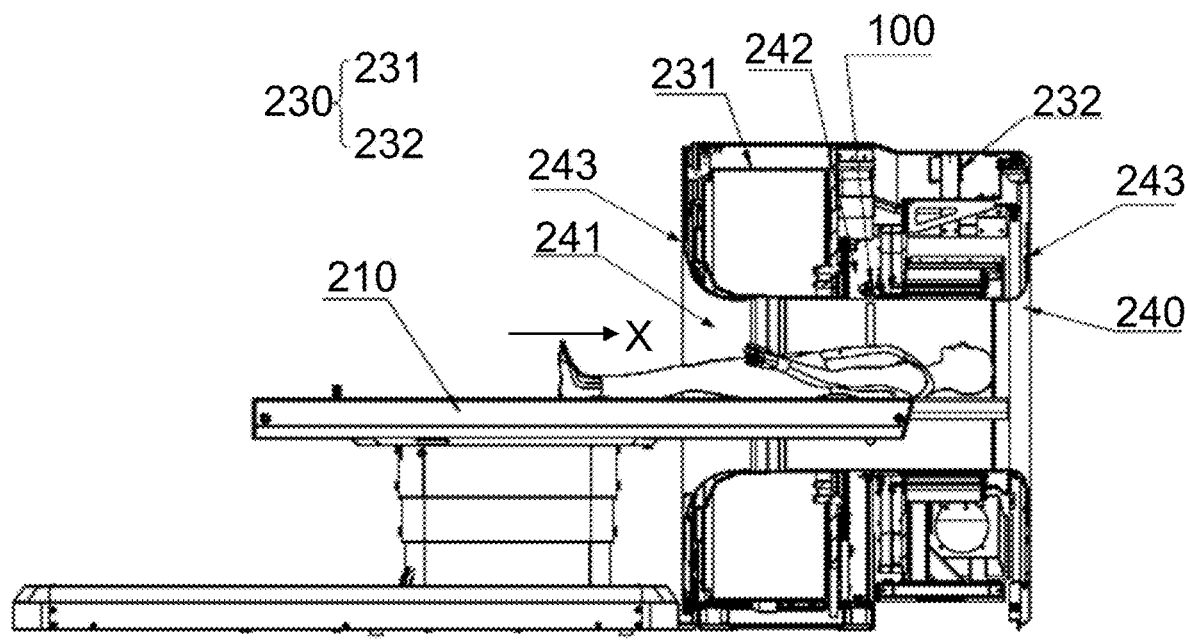
FIG. 2 is a schematic diagram illustrating an exemplary structure of a medical imaging device according to some embodiments of the present disclosure.

FIG. 2 is a schematic diagram illustrating an exemplary structure of a medical imaging device according to some embodiments of the present disclosure.

As shown in FIG. 2, a medical imaging device 200 may include a physiological signal acquisition system 100, a scanning bed 210, at least one frame 230, and a housing 240. The housing may include a chamber 242, the housing has a chamber 242, the housing 240 may form a scanning chamber 241, the frame 230 may be arranged in the chamber 242, and the scanning bed 210 may be used to extend movably or rotatably into the scanning chamber 241 on an axial direction of the scanning chamber 241. In some embodiments, the physiological signal acquisition system 100 may be arranged on an end face 43 of the housing 240, in the scanning chamber 241, or in the chamber 242. In some embodiments, the physiological signal acquisition system 100 may be partially arranged in the chamber 242, and may partially penetrate the housing 240 from the chamber 242 and extend into the scanning chamber 241. Preferably, the physiological signal acquisition system 100 may be arranged at one end of at least one of frame 230 on the axial direction of the scanning chamber 241.

Figure 3:
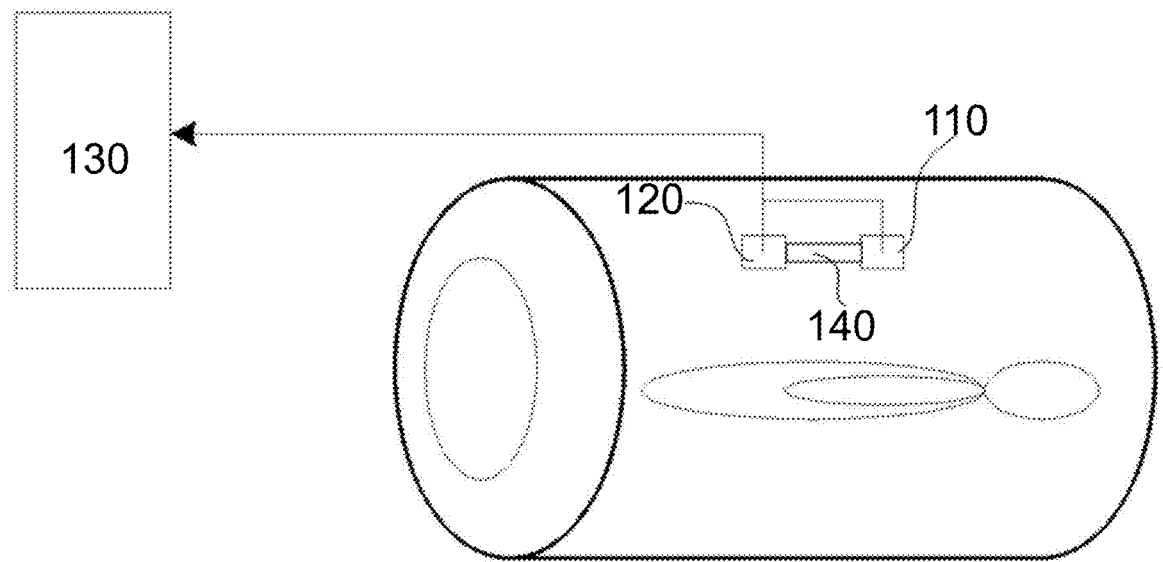
FIG. 3 is a schematic diagram illustrating an exemplary structure of a system for acquiring a physiological signal according to some embodiments of the present disclosure.

FIG. 3 is a schematic diagram illustrating an exemplary structure of a system for a physiological signal according to some embodiments of the present disclosure. As shown in FIG. 2 and FIG. 3, the physiological signal acquisition system 100 may include a projection module 110, an acquisition module 120, and a processing module 130. The projection module 110 and the acquisition module 120 may communicate with the processing module 130, respectively. In some embodiments, the physiological signal acquisition system 100 may further include a pedestal 140, the acquisition module 120, and the projection module 110 may be movably or rotatably arranged on the pedestal respectively. In some embodiments, the scanning bed 210 may be movably or rotatably arranged on the pedestal 140. Specifically, the scanning bed 210 may be slidably connected with a corresponding guide rail through a sliding base, so that the scanning bed 210 may be movably extended into the scanning chamber 241 on the axial direction of the scanning chamber 241, the physiological signal acquisition system 100 may be arranged on the end face 243 of the housing 240, in the scanning chamber 241, or in the chamber 242. When scanning the target, the target may lie on the scanning bed 210, and the position of the target may be adjusted by moving the scanning bed 210, to make the physiological signal acquisition system 100 obtain the physiological signal (e.g., the breathing signal, the heartbeat signal, etc.) of the target based on physiological changes of specific portion (such as abdomen, chest, head, etc.) of the target.

In some embodiments, the projection module 110, the acquisition module 120, and the processing module 130 may be connected with the housing 240 directly, for example, the projection module 110, the acquisition module 120, and the processing module 130 may be connected with the housing 240 by bonding, clamping, welding, and other connection manners. In some embodiments, the projection module 110, the acquisition module 120, and the processing module 130 may be connected with the housing 240 by the pedestal 140 and arranged in the scanning chamber 241 or in the chamber 242. For example, the pedestal 140 may be fixedly arranged in the scanning chamber 241, or on the end face 243 of the housing 240, or the pedestal 140 may be fixedly arranged on a side of the chamber 242 of the housing 240 away from the scanning chamber 241. In some embodiments, the processing module 130 may be integrated with the projection module 110 and the acquisition module 120 in the housing 240 or on the pedestal 140 at the same time, the processing module may also be arranged independently from the projection module 110 and the acquisition module 120, for example, the projection module 110 and the acquisition module 120 may be integrated in the housing 240 or on the pedestal 140, and the processing module 130 may be integrated in a terminal device (e.g., a computer device).

The projection module 110 may be configured to project a structured light to a designated region of the target. Taking the structured light as an example, the projection module 110 may be configured to project the target on the scanning bed 210 to impart the structured light to the surface of the target (a plurality of light spots shown in FIG. 4). The acquisition module 120 may be configured to acquire reflected structured light from formed by the structured light reaching designated region. In some embodiments, the acquisition module 120 may be a camera, the camera may be used to capture the images of the target in different video frames projected by the projection module 110. The processing module 130 may determine the physiological signal of the target based on the reflected structured light acquired by the acquisition module. For example, the processing module may capture the images of different video frames, and determine information of the position and depth of target according to the changes of optical signal caused by the target to restore the entire 3D space, which may obtain an outline of the target and further obtain the physiological signal of the target, such as the heartbeat signal or the breathing signal. In some embodiments, the medical imaging device may obtain the physiological signal determined by the physiological signal acquisition system 100, and trigger the scanning according to the physiological signal. For example, the physiological signal acquisition system 100 may be used to gate triggering of the medical imaging device 200, so that the medical imaging device 200 may complete the scanning of the designated portion of the target within a specific time frame and the occurrence of the artifacts may be reduced in scanning image caused by the breathing or heartbeat of the target. With this configuration, a structured light technology may be used to acquire the physiological signal of the target, such as the breathing signal and the heartbeat signal, when performing the medical scanning, the position of the patient may be relatively fixed and stationary, the breathing and heartbeat of target may cause slight movement or fluctuation of the designated portion of the target, and the scanning image may produce artifacts. The processing module 130 may obtain the physiological signal and may be applied to gate triggering of the medical imaging device 200, which may obtain information of vital signs without depth data and detect the physiological signal of the target under any postures, even when the skin is not exposed, the physiological signal of the target may be accurately detected, which may improve the imaging efficiency and image accuracy of the medical imaging device 200. In addition, the way of integrating the projection module 110 and the acquisition module 120 into the physiological signal acquisition system 100 may be also conducive to simplifying the structure, reducing the overall size of the medical imaging device 200, reducing hardware cost, and improving the reliability. In some embodiments, the medical image (i.e., the scanning image) obtained by the medical imaging device may perform a calibration processing based on the physiological signal of the target to eliminate the artifacts in the scanning image. In some embodiments, when scanning the target, the breathing of the target may be monitored by the physiological signal (such as a breathing signal) acquired by the physiological signal acquisition system, if the breathing signal of the target is abnormal, the operator may guide the target to ensure the stable breathing and prevent the contour of the chest or upper abdomen of the target from violent fluctuations, which may reduce the artifacts in the scanning image and improve the imaging efficiency and clarity of the medical imaging device.

Figure 4:
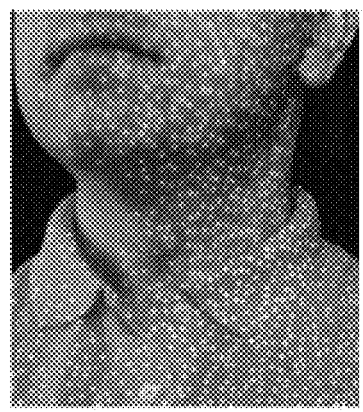
FIG. 4 is a schematic diagram illustrating an exemplary structured light according to some embodiments of the present disclosure.

FIG. 4 is a schematic diagram illustrating an exemplary structured light according to some embodiments of the present disclosure. As shown in FIG. 4, the principle of a structured light acquisition technology may be described below: the projection module 110 may project a group region of the human body, and an additional structured light may be imparted to a part of surface of the human body. In some embodiments, the structured light may include the shape, size, and position of the plurality of light elements, the different projected regions of the structured light may be referred to as "elements". The motion of human body in related to the breathing and/or heartbeat may cause changes in one or more of light distribution, shape distribution, size distribution, positional distribution of elements of the structured light, and/or changes of the count of elements. These changes may obtain the plurality of images of the video frames obtained by the acquisition module 120, and the images of the video frames may determine by the acquisition module 120 to obtain the value signal representing the heartbeat and/or breathing of the target, in other words, the plurality of images of the video frame acquired by the acquisition module 120 may obtain the breathing signal and/or heartbeat signal of the target processed by the processing module 130.

In some embodiments, the medical imaging device may trigger the scanning based on the waveform of the physiological signal according to the scanning sequence configuration. Taking the breathing signal for example, the breathing signal may be similar to a half sine waveform, and combined with the current scanning sequence configuration, an appropriate time may be selected to generate a trigger signal. In some embodiments, the trigger signal may be triggered at a rising edge, a falling edge, or a highest point of the waveform of the physiological signal.

Figure 5:
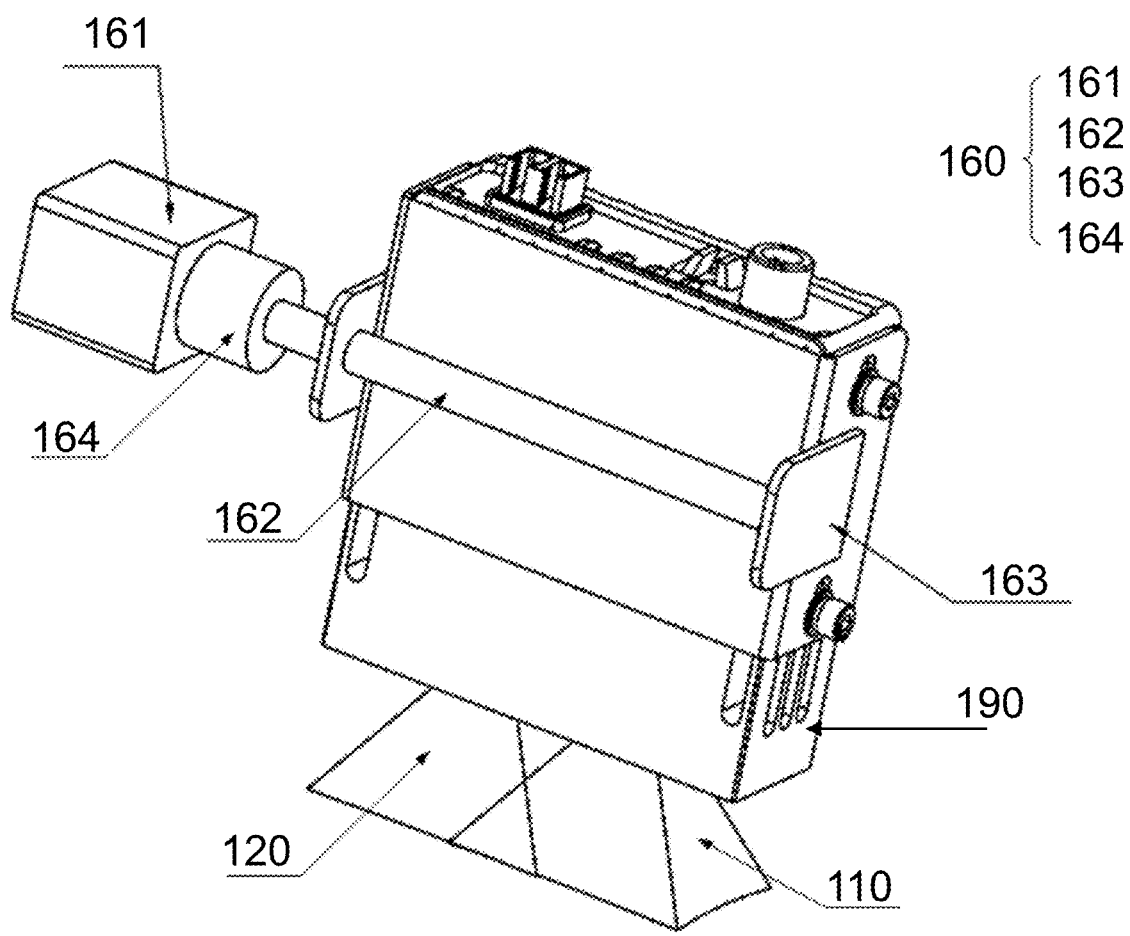
FIG. 5 is a schematic diagram illustrating an exemplary structure of a first driving assembly, a projection module, and an acquisition module according to some embodiments of the present disclosure.

FIG. 5 is a schematic diagram illustrating an exemplary structure of a first driving assembly, a projection module, and an acquisition module according to some embodiments of the present disclosure. As shown in FIG. 5, the acquisition module 120 and the projection module may be arranged on the pedestal 140. In some embodiments, the acquisition module 120 and the projection module 110 may be movably or rotatably arranged on a pedestal 140. In some embodiments, the acquisition module 120 may move with a movement of the scanning bed 210 or the projection module 110. Taking the scanning chamber 241 as a cylindrical as an example, an arrow X shown in FIG. 2 may be used to represent the axial direction of the scanning chamber 241, a radial direction of the scanning chamber 241 may be not shown, the projection module 110 and the acquisition module 120 may be connected with the pedestal 140, the pedestal 140 may move with the axial direction of the scanning chamber 241 or rotate with the radial direction of the scanning chamber 241. For example, the pedestal 140 may be movably connected with the housing 240 by the structure of air cylinder, hydraulic cylinder, screw rod, guide rail, etc. For example, the pedestal 140 may be rotatably connected with the housing 240 through a motor-driven rotating shaft and a gear member. In some embodiments, the acquisition module 120 may be movably or rotatably arranged on the pedestal 140. By way of illustration only, for example, the projection module 110 or the acquisition module 120 may be moveably arranged on the pedestal 140 by at least one of a rotating shaft, a gear member, or a driving assembly (e.g., the first driving assembly 160 and the second driving assembly 170) and other structures. As another example, the projection module 110 or the acquisition module 120 may be movably or rotatably arranged on the pedestal 140 by at least one of the structures of a screw, a guide rail, etc. The acquisition module 120 may move with the scanning bed 210. It should be noted that the moving here may include rotation and/or translation. Further, the rotation shafts of the projection module 110 and the acquisition module 120 may be coincident and rotatably arranged. In other embodiments, the rotation shafts of the projection module 110 and the acquisition module 120 may be different, or one of the projection module 110 and the acquisition module 120 may be rotated in relative to the pedestal 140, another one may be fixedly arranged on the pedestal 140, those skilled in the art may configure according to an actual situation. In some embodiments, the projection module 110 and the acquisition module 120 may be not limited to rotating around the radial direction of the scanning chamber 241, the positions of the projection module 110 and/or the acquisition module 120 may also be adjusted in translation up, down, left, and right, or around an edge of scan field of view to meet different postures and monitoring ranges of the target. Those skilled in the art may adjust the moving modes of the projection module 110 and the acquisition module 120 according to an actual situation, which may be not further limited here. It should be noted that in the example shown in FIG. 5, the projection module 110 and the acquisition module 120 may be arranged on a same side wall of a carrier 190, wherein the working range of the projection module 110 and the acquisition module 120 may overlap each other, in fact, since the projection module 110 and the acquisition module 120 have a certain distance from the target, the working range of the projection module 110 and the acquisition module 120 should roughly coincide when extending to the body surface of the target, or the working range (i.e., a capture range) of the acquisition module 120 may slightly larger than the working range (i.e., a projected range) of the projection module 110, so that the acquisition module 120 may acquire the structured light projected by the projection module 110 effectively. In some embodiments, the projection module 110 and the acquisition 120 may be arranged on different side walls of the carrier 190, for example, the projection module 110 may be arranged on the bottom of the carrier 190 as shown in FIG. 5, and the acquisition module 120 may be arranged on a side wall of the carrier 190 adjacent to the side wall wherein the projection module 110 is located.

Referring to FIG. 5, in some embodiments, the physiological signal acquisition system 100 may further include a first driving assembly 160, the first driving assembly 160 may be connected with the projection module 110 and the acquisition 120, configured to drive the projection module 110 and the acquisition module 120. In some embodiments, the first driving assembly 160 may include a first motor 161, a first driving shaft 162, and a first support 163, the first motor 161 being connected with the pedestal 140, the first driving shaft 162 being coupled with the first motor 161, and the first motor 161 may be configured to drive the first driving shaft 162; the first support 163 may be connected with the first driving shaft 162, and the projection module 110 and the acquisition module 120 may be connected with the first support 163.

In some embodiments, the first motor 161 may be a servo motor, and an output end of the first motor 161 may be coupled with the first drive motor 162 by a coupling 164 and configured to drive the first driving shaft 162. In other embodiments, the first motor 161 may be coupled with the first driving shaft 162 by other transmission components, for example, the use of gear sets or pulley sets, etc., to drive the first motor shaft 162 to rotate. In some embodiments, the first support 163 may be provided with a through hole, the first driving shaft 162 may pass through the through hole to realize a connection between the first driving shaft 162 and the first support 163. Preferably, an inner diameter of the through hole may be slightly smaller than an outer diameter of the first driving shaft 162, the first driving shaft 162, and the through hole may be connected by interference fit to realize torque transmission between the first driving shaft 162 and the through hole, so that the first driving shaft 162 may drive the first support 163 to rotate. In other embodiments, the first driving shaft 162 may be connected with the through hole by welding or gluing, or the first driving shaft 17 and the through hole may be arranged in a non-circular shape to realize the torque transmission, those skilled in the art may choose an appropriate connection manner according to an actual situation. Further, the projection module 110 and the acquisition module 120 may be fixedly arranged on the first support 174 by the screw. In some embodiments, when the medical imaging device is a magnetic resonance device, the screw may be constructed of non-magnetic material to avoid interference with magnetic resonance imaging. By the rotation of the first motor 161, the effect of driving the projection module 110 and the acquisition module 120 may be realized, and stepless adjustment of the angles of the projection module 110 and the acquisition module 120 may be realized.

In some embodiments, the first support 163 may be U-shaped, and the first support 163 and the first driving shaft 162 have at least two connection points. The U-shaped first support 163 may include two flanks, the through hole may be arranged on the flank of the first support 163 close to the first motor 161, as set forth above, the connection of the first driving shaft 162 and the through hole of the first support may be regarded as a connection point, one end of the first driving shaft 162 away from the first support 163 may be further connected with another flank of the first support 163 (which may be connected by welding, gluing, etc.), which may be regarded as a second connection point. When the first support 163 is connected with the first driving shaft 162 only through a connection point at the through hole, one end of the first support 163 away from the first motor 161 may be regarded as a cantilever end, when the projection module 110 and the acquisition module arranged on the first support 163 rotates with the first support 163, there may generate radial runout or wiggle. The first support 163 and the first driving shaft may include at least two connection points, which may restrict the radial runout or wiggle of the end of the first support 163 away from the first motor 161 and improve the rotation accuracy and reliability of the projection module 110 and the acquisition module 120. It should be noted that the first support 163 is not limited to the U-shaped above, which may also be other structures, for example, the first support 163 may be a rectangular structure, the first driving shaft 162 may penetrate through opposite side walls of the rectangular structure, or may be fixedly connected with one side wall of the rectangular structure, correspondingly, the projection module 110 and the acquisition module 120 may be connected with the rectangular structure. In some embodiments, the projection module 110 and the acquisition module 120 may be further connected with the first driving shaft 162 directly without the first support 163, for example, the projection module 110 and the acquisition module 120 may be connected with the first driving shaft 162 by fixtures (e.g., clamp, hoop).

In other embodiments, the projection module 110 and the acquisition module 120 may move with the scanning bed 210 to match the position of the target on the scanning bed 210 in real time. In other embodiments, the projection module 110 and the acquisition module 120 may move with the designated posture of the target (the posture may at least include head position, foot position, supine, prone, side lying of the target) determined by the protocol information corresponding to the current scanning protocol to match the position of the target on the scanning bed 210.

Figure 6:
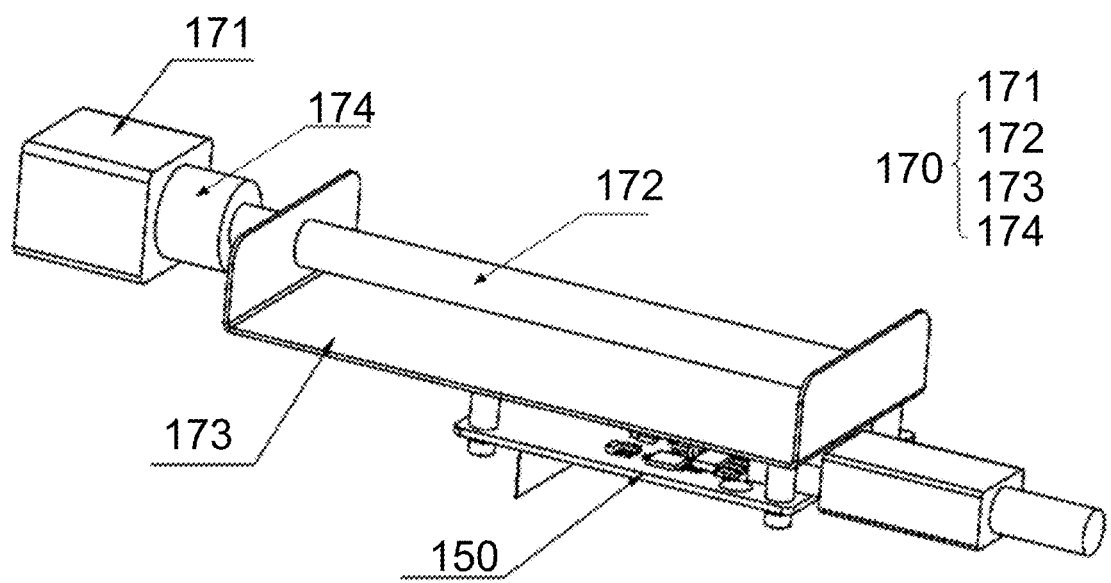
FIG. 6 is a schematic diagram illustrating an exemplary structure of a second driving assembly and a radar module according to some embodiments of the present disclosure.

FIG. 6 is a schematic diagram illustrating an exemplary structure of a second driving assembly and a radar module according to some embodiments of the present disclosure. As shown in FIG. 6, in some embodiments, the physiological signal acquisition system 100 may include a radar module 150, and the radar module 150 may be configured to obtain a reflected wave from the target on the scanning bed 210. Specifically, the radar module 150 may emit the electromagnetic wave to the target and obtain the reflected wave from the target. In some embodiments, the radar module 150 mat movably or rotatably arranged on the pedestal 140, the radar module 150 may communicate with the processing module 130, and the processing module 130 may acquire the physiological signal of the target (e.g., the breathing signal) based on the reflected wave obtained by the radar module 150.

In some embodiments, the processing module 130 may be configured to obtain the position information of the target based on the images captured by the projection module 110. The radar module 150 may move with the movement of the scanning bed 210, according to the protocol information corresponding to the scanning protocol, or the position of the target obtained by the processing module to match the movement of the scanning bed 210 and the scanning protocol or the position of the target.

In some embodiments, the protocol information corresponding to the scanning protocol may include the information of the designated portion of the target and/or the designated posture of the target, the information of at least one of the designated portion of the target or the designated posture of the target has a preset relationship with the detection position of the radar module, so that the radar module 150 may determine orientation according to the information of the designated portion of the target and/or the designated posture of the target.

In some embodiments, the physiological signal acquisition system 100 may include a second driving assembly 170, the second driving assembly 170 may be connected with the radar module 150, configured to drive the radar module 150 to rotate. In some embodiments, the second driving assembly 170 may include a second motor 171, a second driving shaft 172, and a second support 173, the second motor 171 may be connected with the pedestal 140, and the second driving shaft 172 may be coupled with the second motor 171, the second motor 171 may be configured to drive the second driving shaft 172 to rotate, the second support 173 may be connected with the second driving shaft 172, and the radar module 150 may be connected with the second support 173.

In some embodiments, the second motor 171 may be a servo motor, and the second motor 171 may be coupled with the second driving shaft 172 by a coupling 174, and configured to drive the second driving shaft 172 to rotate. In some embodiments, the radar module 150 may be fixedly connected with the second support 173 by welding, gluing, clamping, screwing, and other fixing methods. When the second motor 171 rotates, the second motor 171 may drive the second support 173 connected to the second driving shaft to rotate, thereby driving the radar module 150 to rotate and realizing stepless adjustment of the angles of the radar module 150. It should be noted that the coupled manner realized by the second motor 171 and the second driving shaft may be not limited to the coupling 174, it may also be other transmission components, for example, the second motor 181 may be coupled with the second driving shaft 172 by gear sets or pulley sets.

In some embodiments, the second support 173 may be U-shaped, the second support 173, and the second driving shaft 172 have at least two connection points. Similar to the first support 163, the second support 173 and the second driving shaft 172 may at least include two connection points, to restrict radial runout of an end of the second support 173 away from the second motor 171 and improve the rotation accuracy and reliability of the radar module 150. In other embodiments, the radar module 150 may move with the movement of the scanning bed 210 to match the movement of the scanning bed 210. In some embodiments, the second support 173 may be not limited to the U-shaped, which may also be other structures, for example, the second support 173 may be a rectangular structure, and the second driving shaft 172 may penetrate through opposite side walls of the rectangular structure, or may be fixedly connected with one side wall of the rectangular structure, correspondingly, the radar module 150 may be connected with the rectangular structure. In some embodiments, the radar module 150 may be further connected with the first driving shaft 172 directly without the second support 173, for example, the radar module 150 may be connected with the second driving shaft 172 by fixtures (e.g., clamp, hoop).

In some embodiments, the physiological signal acquisition system 100 may include a control module 180 (not shown in FIG. 1), the control module 180 may communicate with the first driving assembly 160 and the second driving assembly 170 and may be configured to drive the corresponding modules respectively, to make an emitting surface or detection surface of the projection module 110, the acquisition module 120, and the radar module 150 match the movement of the scanning bed. Specifically, the first motor 161 of the first driving assembly 160 and the second motor 171 of the second driving assembly 170 may communicate with the control module of the physiological signal acquisition system 100, respectively, the first motor 161 and the second motor 171 may rotate under the control of the control module, respectively.

Figure 7:
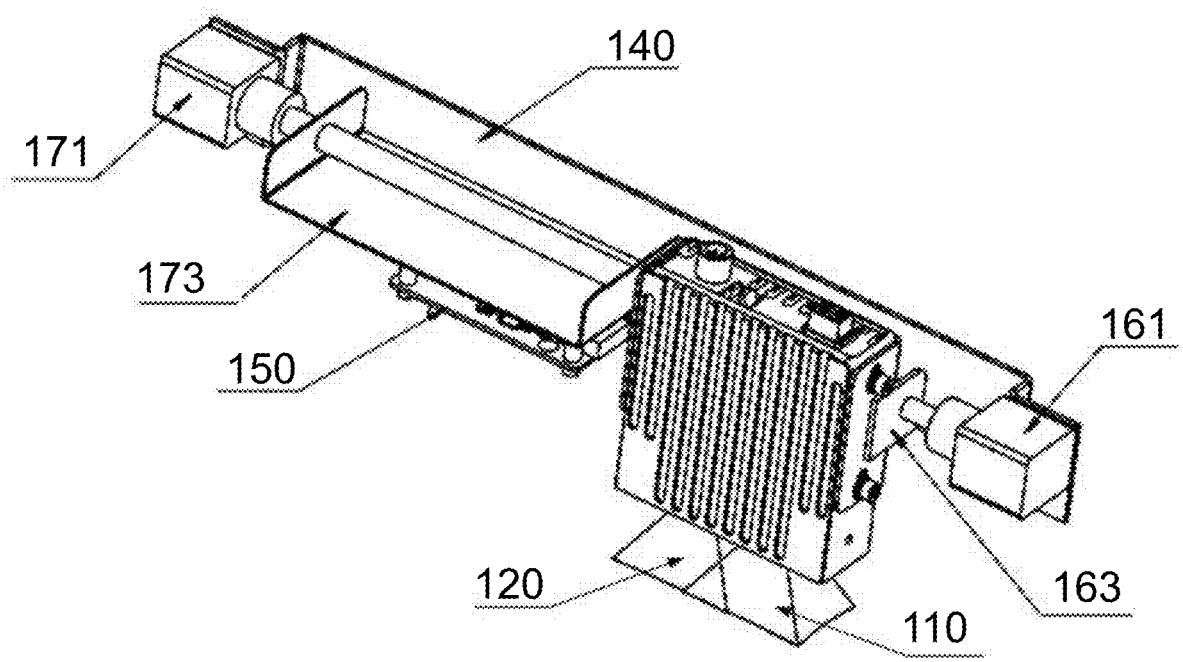
FIG. 7 is a schematic diagram illustrating an exemplary integrated layout of a projection module, an acquisition module, and a radar module according to some embodiments of the present disclosure.

FIG. 7 is a schematic diagram illustrating an exemplary integrated layout of a projection module, an acquisition module, and a radar module according to some embodiments of the present disclosure. In some embodiments, as shown in FIG. 7, the projection module 110, the acquisition module 120, and the radar module 150 may be arranged on the common rotation shaft. For example, the center line of the first driving shaft 162 in the first driving assembly 160 and the center line of the second driving shaft 172 in the second driving assembly 170 may be on a same straight line, or the first driving shaft 162 and the second driving shaft 172 may be a same drive shaft. Taking the scanning chamber 241 as a cylindrical as an example, an arrow X shown in FIG. 2 may be used to represent the axial direction of the scanning chamber 241, a radial direction of the scanning chamber 241 may be not shown, in some embodiments, the rotation axes of the projection module 110, the acquisition module 120, and the radar module 150 may be arranged on the radial direction of the scanning chamber 241. When the scanning bed 210 moves in the axial direction of the scanning chamber 241, the control module 180 may make the projection module 110, the acquisition module 120, and the radar module 150 may rotate simultaneously by controlling the first driving assembly 160 and the second driving assembly 170, so that the physiological signal acquisition system 100 may complete the acquisition of the physiological signal of the plurality of the targets in a scanning processing. For example, the projection module 110 and the acquisition module 120 may obtain the breathing signal and/or motion information of the target, and the radar module 150 may obtain the breathing signal and/or motion information of the target. In addition, when the target moves on the scanning bed 210, the projection module 110, the acquisition module 120, and the radar module 150 may obtain desired motion information, such as abdominal breathing, chest heartbeat, head movement, and other information of the target accurately, by adjusting the angels simultaneously, and obtain the desired motion information by controlling the working states of different modules, and improve the imaging efficiency and image accuracy of the medical imaging device. The way of integrating the projection module 110, the acquisition module 120, and the radar module 150 in the physiological signal acquisition system 100 may be also conducive to simplifying the structure and reducing the overall size of the device.

It should be noted that the radar module 150 is not limited to only rotating around the radial direction of the scanning chamber 241, in other embodiments, the position of the radar module 150 may be adjusted in translation up, down, left, and right, or adjusted around the edge of scan field of view to meet different postures and monitoring ranges of the target. Those skilled in the art may transform according to the prior art, and this embodiment may not be further described.

As shown in FIG. 2, in some embodiments, the medical imaging device 200 may include two frames 230, the frame 230 may include a CT frame 231 and a PET frame 232, and the CT frame 231 and the PET frame 232 may be arranged on the axial direction of the scanning chamber 241 (the arrow X shown in FIG. 2). In some embodiments, the physiological signal acquisition system 100 may be arranged a chamber corresponding to the CT frame 231 and/or in a chamber corresponding to the PET frame 232. For example, the pedestal 140 of the physiological signal acquisition system 100 may be connected with an inner wall corresponding to the chamber of the CT frame 231 and/or the PET frame 232. In some embodiments, the physiological signal acquisition system 100 may be arranged on an end face of the CT frame 231 at one end away from the PET frame 232, or at an end face of the PET frame 232 at one end away from the CT frame 231. In some embodiments, the physiological signal acquisition system 100 may also be arranged between the CT frame 231 and the PET frame 232 and may be connected with the PET frame 232. Specifically, the pedestal 140 (not shown in FIG. 2) may be fixed on a back plate of the PET frame 232, which may make an inner structure of the medical imaging device more compact, the cables may be routed conveniently, and the overall size of the medical imaging device may be shortened. The structure may meet both CT and PET integrated scanning and may meet the needs of separate CT scanning and separate PET scanning.

In some embodiments, the control module 180 may communicate with the driving system of the scanning bed 210, and the control module 180 may be configured to obtain the information of the designated portion of the target in the protocol information corresponding to this scanning protocol obtained by the driving system of the scanning bed 210. The control module 180 may drive the first motor 161 and/or the second 171 to adjust the position and the orientation of the projection module 110, the acquisition module 120, and the radar module 150 based on the designated portion of the target and/or the posture of the target in the protocol information, so that the working of the projection module 110, the acquisition module 120, and the radar module 150 (include but does not limit to respective rotations of the projection module 110, the acquisition module 120, and the radar module 150) may communicate with the medical scanning workflow to match the movement of the scanning bed 210. Specifically, the different target has different scanning designated portion each time, the driving system of the scanning bed 210 may include a selected scanning protocol before the scanning, and the protocol information corresponding to the scanning protocol may include the designated portion of the target and/or the designate posture of the target, the physiological signal acquisition system 100 may obtain the information of the designate region of the target in the protocol information corresponding to the scanning protocol by communicating with the driving system of the scanning bed 210 by the control module 180, so that the working of the projection module 110, the acquisition module 120, and the radar module 150 may match with the movement of the scanning bed 210 accurately.

Further, the projection module 110, the acquisition module 120, and the radar module 150 may communicate with the control module, and the rotation angles or movement positions of the projection module 110, the acquisition module 120, and the radar module 150 may be adjusted according to the information of the designated portion of the target and/or the designated posture of the target in the protocol information. The projection module 110, the acquisition module 120, and the radar module 150 may obtain the information of the designated portion of the target and/or the designated posture of the target by communicating with the control module, so that the rotation angles or movement positions of the projection module 110, the acquisition module 120, and the radar module 150 may match with the scanning protocol.

The medical imaging device 200 in the embodiments of the present disclosure may be applied to different types of targets and the scenarios for different types of scanning devices, the medical imaging device provided by the embodiment may be described below through two exemplary usage scenarios.

Scenario One: For Different Types of Targets.

The medical imaging device provided in the embodiment may automatically adjust with different targets (e.g., different heights, different weights, different genders, different ages, etc.), to ensure that the projection module 110, the acquisition module 120, and the radar module 150 may cooperate with various types of targets. The specific embodiment is as: the projection module 110, the acquisition module 120, and the radar module 150 may communicate with the control module 180 respectively, and the processing module 150 may obtain the designated portion of the target and/or the designated posture of the target in the protocol information corresponding to this scanning protocol, and control the first driving assembly 160 (the first motor 161 of the first driving assembly 160) and/or the second driving assembly 170 (the second motor 171 of the second driving assembly 170) to adjust the positions of the projection module 110, the acquisition module 120, and the radar module 150, to match the different types of target.

Scenario Two: For PET or CT Scanning Scenarios.

When performing the CT scanning, the control device may adjust CT scanning view, since when performing the CT scanning, the target may move with the movement of the scanning bed, and the monitor portion may move with the movement of the scanning bed. At this time, by driving the first motor 161 and the second motor 171, the projection module 110, the acquisition module 120, and the radar module 150 may be adjusted to realize the movement with the target. The manner of performing the PET multi-bed scanning may be the same as the above CT scanning, and the description may not be repeated here.

It should be noted that the medical imaging device 200 shown in FIG. 2 above is only an example, the medical imaging device 200 may be not limited to the above CT frame 231 and PET frame 232, but may also be other types of frames. It should be understood that the physiological signal acquisition system 100 provided in the embodiment may be applied to any medical imaging equipment in CT, MR, PET, SPECT, etc., or any two of them may be combined in the medical imaging device.

Figure 8:
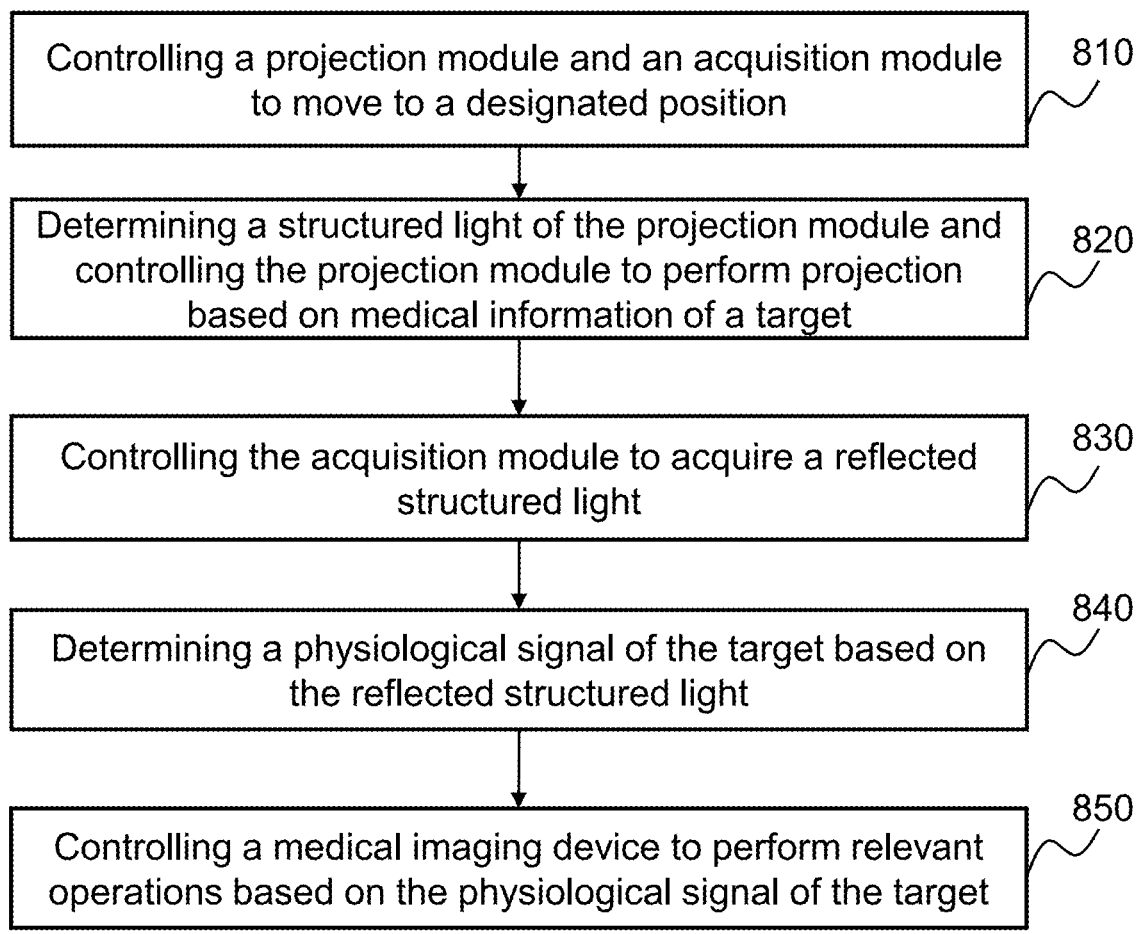
FIG. 8 is a flowchart illustrating an exemplary control method of a medical imaging device according to some embodiments of the present disclosure.

FIG. 8 is a flowchart illustrating an exemplary control method of a medical imaging device according to some embodiments of the present disclosure. The specific content of the medical imaging device here may refer to the medical imaging device 200 shown in FIGS. 2-7. As shown in FIG. 8, process 800 of the control method of the medical imaging device may include the following operations:

In 810, the projection module 110 and the acquisition module 120 may be controlled to move to a designated position.

In some embodiments, operation 810 may be executed by the control module 180, the control module 180 may adjust the projection module and the acquisition module to move to the designated position by controlling the first motor of the first driving assembly, to make the projection range of the acquisition module or the acquisition module of the acquisition module arranged at the designate region of the target. When scanning the target by using the medical imaging device, the target may be lying on the scanning bed, the target may move with the movement of the scanning bed to the scanning chamber, when the portion to be scanned of the target reaches the designated position, the processing module 130 may issue instructions to the control module 180 to control the first motor of the first driving assembly to adjust the projection module and the acquisition module, so that the projection module and the acquisition module may move to the designate position, for example, the projection module and the acquisition module may move above the chest, abdomen, or head of the target. In some embodiments, the projection module and the acquisition module may move to the designated position by adjusting the position of the pedestal 140.

In 820, the structured light of the projection module may be determined and the projection module may be controlled to perform projection based on the medical information of the target.

The medical information of the target may refer to specific position information related to the target to be scanned (e.g., head, chest, abdomen, etc.), the posture information of the target lying on the scanning bed, etc. After the target moves to the designated region of the scanning chamber, the structured light of the projection module may be determined based on the information related to the target to be scanned, after determining the structured light of the projection module, the position, the projection direction of the projection module may be adjusted and the projection module may be started according to the relevant information related to the portion to be scanned of the target, so that the projection module may emit the structured light and project the structured light to the designate position of the target. In some embodiments, the structured light may include natural light or artificial ambient light (e.g., a light from a light device). In some embodiments, the natural light or artificial ambient light may be visible or invisible light (e.g., an infrared light). Taking the structured light as an example, the projection module 110 may impart an addition (a natural light or an artificial ambient light) structured light to a part of surface of the human body. In some embodiments, the structured light may include the shape, size, and position distribution of the plurality of light elements. In some embodiments, determining the structured light of the projection module may include determining one or more of the count, shape, size, and position of light elements in the light elements.

In 830, the acquisition module may be controlled to acquire the reflected structured light.

The reflected structured light may refer to the information reflected the structured light projected on the human body of the target. For example, the structured light may be an optical signal, the reflected structured light may be an optical signal that is reflected after being projected on the body of the target. In some embodiments, the acquisition module may include a acquired end configured to acquire the reflected structured light, controlling the acquisition module to acquire the reflected structured light may include: starting the acquisition module, adjusting the position of the acquisition module, and the direction of the acquisition end (e.g., the acquisition end faces the head, chest, or abdomen of the target), so that the acquisition module may acquire the reflected structured signal from the target. In some embodiments, the acquisition module may be a camera, the acquisition module may obtain the plurality of images of the video frames by capturing changes of elements of the structured light caused by body motion of the target in different time.

In 840, the physiological signal of the target may be determined based on the acquired reflected structured light.

In some embodiments, operation 840 may execute by the processing module 130. When the human body performs the physiological movements (e.g., breathing, heartbeat, motion), the contour of the body of a user (e.g., chest, head) may fluctuate, in some embodiments, the processing module may determine information of the target such as the position and depth of the body surface according to a change of the reflected structured light (e.g., an optical signal) caused by the target, and further obtain a change of a contour corresponding to the designated portion of the target and the physiological signal of the target by restoring an entire three dimensional (3D) space. In some embodiments, the physiological signal may include a breathing signal, a heartbeat signal, motion information, etc. Based on the above principles, the processing module may convert the changes of elements of the structured light caused by body motion of the target to a value signal representing the heartbeat and/or breathing of the target based on processing the plurality of images of the video frames captured by the acquisition module in different time points. In other words, the plurality of images of the video frames acquired by the acquisition module may obtain the breathing signal and/or the heartbeat signal of the target processed by the processing module. In some embodiments, the processing module may further obtain the motion information of the target based on the plurality of images of the video frames processed by the processing module.

In 850, the medical imaging device may be controlled to perform one or more relevant operations based on the physiological signal of the target.

In some embodiments, controlling the medical imaging device to perform the one or more relevant operations may include: obtaining a final medical image by correcting a medical image obtained by the medical imaging device based on the physiological signal of the target. When performing the medical scanning, the position of the target may be relatively fixed and stationary, and the breathing and heartbeat of the target may cause slight movement or fluctuation of the designated portion of the target (also known as portion to be scanned), and the scanning image may produce the artifacts, the physiological signal of the target herein may determine the motion information of the designate region (e.g., the frequency of breathing, the fluctuation of chest contour during the breathing, etc.), when processing the scanning image, the scanning image may be corrected combined with the motion information of the designate region of the target, to improve the imaging efficiency and clarity of medical imaging device.

In some embodiments, controlling the medical imaging device to perform the one or more relevant operations based on the physiological signal of the target may further include: determining operation time of the medical imaging device based on the physiological signal of the target. For example, the physiological signal acquisition system of the medical imaging device may be configured to gate triggering of the medical imaging device, so that the medical imaging device may complete the scanning of the designated region of the target within a specific time frame, and the occurrence of the artifacts may be reduced in scanning image caused by the breathing or heartbeat of the target. In some embodiments, the scanning may be triggered based on the waveform of the physiological signal and the configuration of scanning sequence. Taking the breathing signal as an example, the breathing signal may be similar to a half sine waveform, and combined with the current scanning sequence configuration, an appropriate time may be selected to generate a trigger signal. In some embodiments, the trigger signal may be triggered at a rising edge, a falling edge, or a highest point of the waveform of the physiological signal.

In some embodiments, controlling the medical imaging device to perform the one or more relevant operations based on the physiological signal of the target may further include: guiding the target to breath based on the physiological signal of the target. When scanning the target, the breathing of the target may be monitored by the physiological signal (such as a breathing signal) acquired by the physiological signal acquisition system, if the breathing signal of the target is abnormal, the operator may guide the target to ensure the stable breathing and prevent the contour of the chest or upper abdomen of the target from violent fluctuations, which may reduce the artifacts in the scanning image and improve the imaging efficiency and clarity of the medical imaging device. In some embodiments, the breathing guidance of the target may be judged and guided by the operator according to the physiological signal of the target. In some embodiments, the breathing guidance of the target may be executed by the medical imaging device. For example, the processing module of the medical imaging device may judge whether the frequency of the breathing signal of the target is within a preset range, if the frequency of the breathing signal of the target is not within a preset range, the breathing guidance of the target may be performed by the medical imaging device. In some embodiments, the medical imaging device may include a prompt module for sending guidance information, the prompt module may be configured to perfume the breathing guidance of the target. In some embodiments, the prompt module may include a speaker, a display, etc. In some embodiments, the prompt module may include but is not limited to any one of sound, text, image, video, or any combination thereof.

In some embodiments, the control method of the medical imaging device may further include: controlling the radar module may move to the designated position, and determining the physiological signal of the target based on the acquired reflected structured light, including determining the heartbeat signal and/or the motion information based on the radar module. The radar module may emit the electromagnetic wave to the target and receive the reflected wave of the target. When performing the medical scanning, the position of the target may be relatively fixed and stationary, the breathing, heartbeat, or movement of the target may cause slight motion or movement or fluctuation of the designated portion (e.g., chest chamber), and further cause a change of the radial distance between the radar module and the target, by measuring the change of the radial distance, the breathing signal and the heartbeat signal of the target may be determined. In some embodiments, the radar module may detect other movements, for example, when the radar module detects the head of the target, the head of the target may move. Therefore, when the medical imaging device scans the head, motion information of the head of the user may be determined by the radar module, and the scanning image may be corrected based on the motion information, to avoid producing artifacts in the final scanning image.

In some embodiments, before controlling the projection module, the acquisition module, or the radar module moves to the designated position, the control method of the medical image may include: obtaining relevant information in the protocol information, and determining the designated position of the projection module, the acquisition module, or the radar module based on the relevant information. In some embodiments, the relevant information in the protocol information may include at least one of the designated portion of the target, the designated posture of the target, position information of the scanning bed, or a type of the medical imaging device. In some embodiments, the control module may communicate with the driving system of scanning bed, the control module may be configured to obtain information of the designated portion of the target in the protocol information corresponding to the scanning protocol obtained by the driving system of scanning bed. The control module may drive the first motor and/or the second motor to adjust the position and direction of the projection module, the acquisition module, and the radar module based on the designated portion of the target and/or the designated posture of the target in the protocol information, so that the working of the projection module, the acquisition module, and the radar module (include but does not limit to respective rotations of the projection module 110, the acquisition module 120, and the radar module 150) may communicate with the medical scanning workflow to match the movement of the scanning bed 210. Specifically, different patient may scan different designate portion each time, the drive system of the scanning bed may include a selected scanning protocol information before the scanning, and the scanning protocol information may include the information of the designated portion of the target and/or the posture information of the target, by controlling the communication between the modules and the driving system of the scanning bed, the information of the designate portion in the protocol information corresponding to the scanning protocol may be obtained to adjust the positions of the projection module, the acquisition module, and the radar module and make the projection module, the acquisition module, and the radar module move to the designate portion to match with the movement of the scanning bed. In some embodiments, before controlling the projection module, the acquisition module, or the radar module moves to the designated portion, the control method of the medical image may include: obtaining position information of the scanning bed and/or position information of the target on the scanning bed, and determining the designate portion of the projection module, the acquisition module, or the radar module based on the position information of the scanning bed and/or the position information of the target. Different types of targets (e.g., age, gender, weight, height, etc.) have different positions in a same scanning bed, by obtaining the position information of the designated portion of the target on the scanning, combined with the position information of the scanning bed relative to scanning chamber, the positions of the projection module, the acquisition module, or the radar module may be adjusted to the designate portion, to match with the different types of targets.

In some embodiments, the projection module, the acquisition module, and the radar module may communicate with the control module, respectively, the rotation angles or movement positions of the projection module, the acquisition module, and the radar module may be adjusted according to the information of the designated portion of the target and/or the designated posture of the target in the protocol information, to determine the designate portion of the projection module, the acquisition module, and the radar module and make the rotation angles or movement positions of the projection module, the acquisition module, and the radar module match with the scanning protocol.

In some embodiments, the structured light corresponding to the type of the medical imaging device may determine based on the type of medical imaging device. In some embodiments, different types of medical imaging devices may correspond to different structured light, in other words, when scanning the designated portion of the target by using different types of the medical imaging device, the structured light may be different. For example, at least one of the count, shape, size, or position of the light element in the structured light corresponding to the CT scanning device may be different from the light element corresponding to the PET scanning device. In some embodiments, the medical imaging device may include but is not limited to any one or any combination of a Positron Emission Computed Tomography (PET) scanning device, a Computed Tomography (CT) scanning device, a Magnetic Resonance (MR) scanning device, a Single Photon Emission Computed Tomography (SPECT) scanning device. In some embodiments, each medical imaging device may correspond to a structured light, relevant instructions and/or procedures of controlling the projection module project the structured light may pre-store in the storage device of the medical imaging device, after determining the type of medical imaging device, the structured light may be determined, to assist medical imaging device to scan the target. In some embodiments, the structured light may be generated after being determined by the type of medical imaging device. For example, taking the structured light as an example, after determining the type of medical imaging devices, the count, shape, size, or distribution position of light elements may be determined. In some embodiments, different types of medical imaging devices may correspond to the same structured light. In some embodiments, the structured light may also be determined according to the height, weight, age, designated region, and posture of the target lying on the scanning bed.

The basic concepts have been described. Obviously, for those skilled in the art, the detailed disclosure may be only an example and may not constitute a limitation to the present disclosure. Although not explicitly stated here, those skilled in the art may make various modifications, improvements, and amendments to the present disclosure. These alterations, improvements, and modifications are intended to be suggested by this disclosure and are within the spirit and scope of the exemplary embodiments of this disclosure.

What is claimed is:

1. A system for acquiring a physiological signal of a target, comprising:
   a projection module configured to project a structured light to a designated region of the target;
   an acquisition module configured to acquire a reflected structured light formed by the structured light reaching the designated region;
   a radar module configured to obtain a reflected wave from the target, wherein
      the projection module, the acquisition module, and the radar module are movably or rotatably connected with a housing of a medical imaging device; and
   a processing module configured to determine the physiological signal of the target based on the acquired reflected structured light and the reflected wave from the target.

2. The system of claim 1, wherein the acquisition module communicates with the projection module and the processing module, and a relative position between the acquisition module and the projection module is determined according to a processing result of the processing module.

3. The system of claim 1, further comprising:
   a first driving assembly configured to drive the acquisition module and the projection module—to rotate, the acquisition module and the projection module being rotatably arranged on the first driving assembly.

4. The system of claim 3, wherein
   the first driving assembly includes a first motor, a first driving shaft, and a first support;
   the first motor is connected with the pedestal and the first driving shaft—is coupled with the first motor;
   the first motor—is configured to drive the first driving shaft;
   the first support is connected with the first driving shaft, wherein the first support and the first driving shaft have at least two connection points; and
   the acquisition module and the projection module are connected to the first support.

5. The system of claim 1, wherein
   the processing module is further configured to obtain position information of the target based on an image captured by the acquisition module; and
   the radar module moves with a movement of a scanning bed, according to the position information of the target, or according to protocol information.

6. The system of claim 5, wherein the protocol information includes information of at least one of a designated portion of the target or a designated posture of the target, the information of at least one of the designated portion of the target or the designated posture of the target having a preset relationship with a detection position of the radar module.

7. The system of claim 1, further comprising:
   a second driving assembly configured to drive the radar module to rotate, the second driving assembly being connected with the radar module.

8. The system of claim 1, further comprising:
   a control module, a first driving assembly, and a second driving assembly, wherein
   the first driving assembly is configured to drive the acquisition module and the projection module;
   the second driving assembly is configured to drive the radar module to rotate; and
   the control module communicates with the first driving assembly—and the second driving assembly, respectively.

9. The system of claim 1, further comprising:
   a control module configured to adjust rotation angles or movement positions of the projection module, the acquisition module, and the radar module 150 according to real-time position information of the target on a scanning bed to match a movement of the scanning bed.

10. The system of claim 9, wherein the control module is configured to obtain information of at least one of a designated portion of the target or a designated posture of the target in protocol information, the acquisition module, the projection module, and the radar module communicate with the control module respectively, and the rotation angles or the movement positions of the acquisition module, the projection module, and the radar module are adjusted according to the information of at least one of the designated portion of the target or the designated posture of the target in the protocol information.

11. The system of claim 9, wherein when the target moves with a scanning bed,
   the processing module is configured to determine the real-time position information of the target based on images acquired by the acquisition module;
   the projection module and the acquisition module move or rotate with the scanning bed synchronously to match the real-time position information of the target on the scanning bed; and/or the radar module moves or rotates with the scanning bed synchronously to match the real-time position information of the target on the scanning bed.

12. The system of claim 1, wherein the medical imaging device includes two frames, the two frames include a computed tomography (CT) frame and a positron emission tomography (PET) frame, and the CT frame and the PET frame are arranged on an axial direction of the scanning chamber of the medical imaging device; and
   the system is arranged between the CT frame and the PET frame and is connected with the PET frame, and the pedestal is fixed on a back plate of the PET frame.

13. A medical imaging device, comprising a system for acquiring a physiological signal of a target, the system including an acquisition module, a projection module, and a processing module, wherein
   the acquisition module communicates with the projection module and the processing module;
   the projection module is configured to project a structured light to a designated region of a target;
   the acquisition module is configured to acquire a reflected structured light formed by the structured light reaching the designated region projected by the projection module;
   wherein
   the projection module and the acquisition module are movably or rotatably connected with a housing of a medical imaging device; and the processing module is configured to determine the physiological signal of the target based on the reflected structured light acquired by the acquisition module.

14. The medical imaging device of claim 13, wherein the system further includes a radar module;
   the radar module is configured to obtain a reflected wave from the target;
   the radar module is movably or rotatably connected with the housing of the medical imaging device; and the processing module is configured to determine the physiological signal of the target based on the reflected structured light and the reflected wave from the target.

15. A method for controlling a medical imaging device, comprising:
controlling a projection module, an acquisition module, and a radar module of the medical imaging device to move to a designated position; wherein
the projection module, the acquisition module, and the radar module are movably or rotatably connected with a housing of a medical imaging device; and
determining a structured light of the projection module;
controlling the projection module to project the structured light to a designated region of a target;
controlling the acquisition module to acquire a reflected structured light of the structured light formed by the structured light reaching the designated region;
controlling the radar module to emit an electromagnetic wave to the target and receive a reflected wave of the target;
determining a physiological signal of the target based on the reflected structured light and the reflected wave from the target; and
controlling the medical imaging device to perform one or more relevant operations based on the physiological signal of the target.

16. The method of claim 15,
wherein determining the physiological signal of the target based on the reflected structured light includes:
determining a breathing signal based on the reflected structured light; and
determining a heartbeat signal based on the radar module.

17. The method of claim 15, wherein controlling the medical imaging device to perform the one or more relevant operations based on the physiological signal of the target includes:
obtaining a final medical image based on the physiological signal of the target by correcting a medical image obtained by the medical imaging device.

18. The method of claim 15, wherein controlling the medical imaging device to perform the one or more relevant operations based on the physiological signal of the target includes:
determining operation time of the medical imaging device based on the physiological signal of the target.

19. The method of claim 15, further comprising:
before controlling the projection module, the acquisition module, or the radar module to move to the designated position,
obtaining relevant information in protocol information; and
determining the designated position of the projection module, the acquisition module, or the radar module based on the relevant information;
wherein the relevant information in the protocol information includes at least one of position information of a designated portion of the target, position information of a designated posture of the target, position information of a scanning bed, or a type of the medical imaging device.

20. The method of claim 15, further comprising:
before controlling the projection module, the acquisition module, or the radar module to move to the designated position,
obtaining position information of a scanning bed or position information of the target located on the scanning bed; and
determining the designated position of the projection module, the acquisition module, or the radar module based on the position information of the scanning bed or the position information of the target.

* * * * *